(No Model.) 2 Sheets—Sheet 1.
J. J. & R. CROOKE.
PROCESS OF TREATING AND DESILVERIZING COPPER MATTE.
No. 354,182. Patented Dec. 14, 1886.
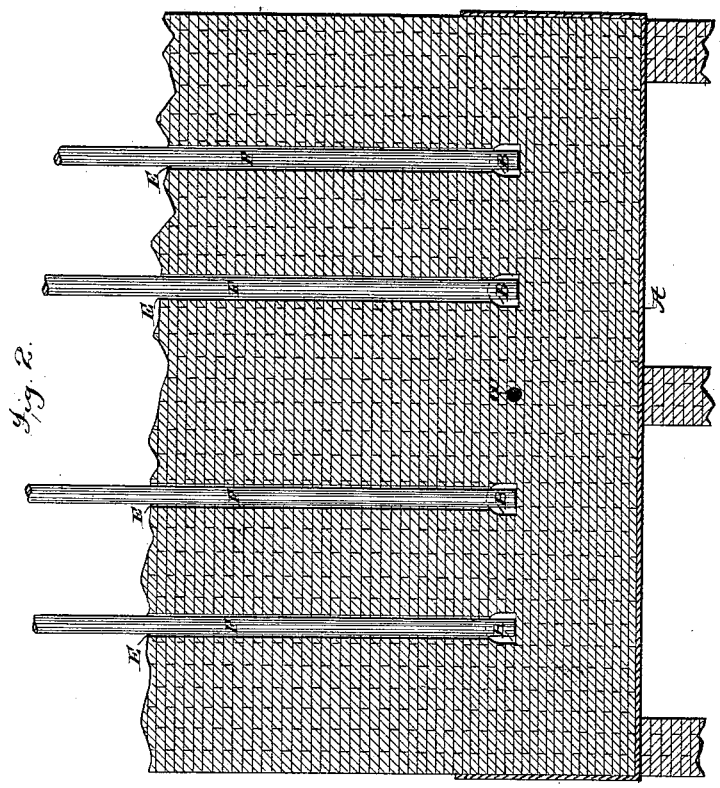
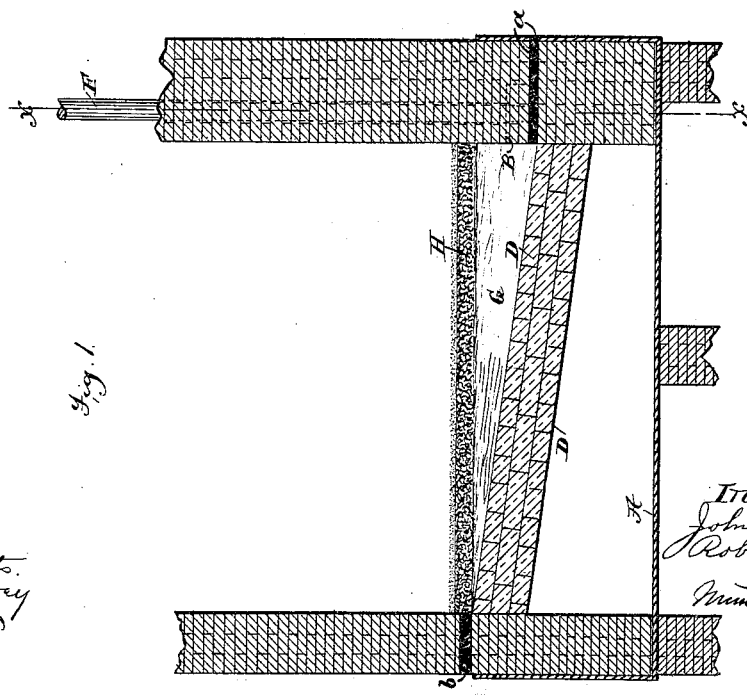

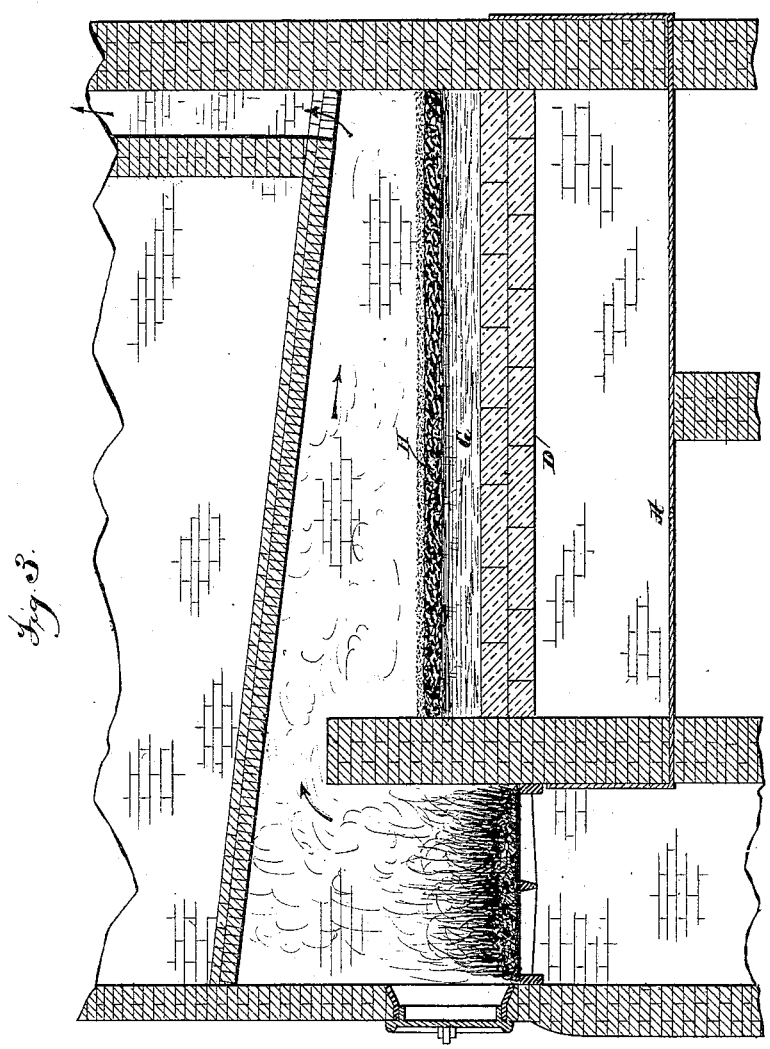

UNITED STATES PATENT OFFICE.

JOHN J. CROOKE AND ROBERT CROOKE, OF NEW YORK, N. Y.

PROCESS OF TREATING AND DESILVERIZING COPPER MATTE.

SPECIFICATION forming part of Letters Patent No. 354,182, dated December 14, 1886.

Application filed February 12, 1886. Serial No. 191,704. (No model.)

*To all whom it may concern:*

Be it known that we, JOHN J. CROOKE and ROBERT CROOKE, citizens of the United States, residing at New York, county of New York, and State of New York, have discovered certain new and useful Improvements in the Process of Treating and Desilverizing Copper Matte and Copper Ores Analogous to Copper Matte, fully described and illustrated in the following specification and the accompanying drawings, forming a part of the same.

There are two prominent varieties of copper "matte" or "regulus." One, the largest in volume of production, is produced by purposely matting the sulphide ores of copper. The other is a by-product derived from the smelting of galena and other ores containing small percentages of disulphide of copper. There is also found in some locations copper ore which in its natural state is analogous to copper matte, and which therefore can be treated by our process without being previously matted, and is therefore to be understood as included within the term "matte," as used in the following description and claims. All of these products contain silver and gold, associated with antimony, arsenic, iron, sulphur, and other elements. "Stack" or "jacket" furnace matte, besides the above-mentioned metals, invariably contains large percentages of lead in combination as sulphide.

It is well known that when copper matte is fused with an equal or unequal quantity of metallic lead the silver and gold, and also the antimony and arsenic and a small part of the copper contained in the matte, will at once commence to alloy with the lead, and if the matte is destitute of lead, as in the case of Montana matte, a small portion of the lead will unite with the matte as a subsulphide. At the same time, however, that this takes place a portion of the sulphur contained in the matte will also unite with the lead, forming sulphide of lead, and as soon as sulphide of lead has thus been formed to any considerable extent not only will the silver and gold cease to pass from the matte to the lead, but the copper of the matte will commence to unite rapidly with the lead, thus tending to make the whole mass homogeneous. By tapping off the lead, however, after it has been in contact with the matte for a few minutes, and before sufficient sulphide of lead has been formed to cause the copper of the matte to unite with the lead to any considerable extent, from twenty to twenty-five per cent. of the silver and gold in the matte may be withdrawn, and thus by repeated applications of pure lead all of the silver and gold may be finally extracted. This, however, would be extremely laborious and expensive, and would consume a great amount of time and require the use of a large quantity of lead, and would also involve great expense and labor in refining and desilverizing so large a quantity of lead to remove the precious metals therefrom.

From the foregoing statement of the reactions which take place between the elements of the matte and the lead it will readily be seen that if the sulphur of the matte is prevented from remaining in combination with the lead the silver and gold of the matte will continue to unite with the lead until all of these metals contained in the matte are withdrawn, or until the lead has become enriched to such an extent as to be refined economically. We have discovered that this can be accomplished by introducing iron into the lead at such a point that it will be out of contact with the fused or melted matte. By this means the sulphur, as fast as it enters the lead, is transferred to the iron, thereby forming sulphide of iron, which rises and passes through the lead and the matte, thus keeping the lead free or comparatively free from sulphur, so that the silver and gold of the matte will continue to pass to the lead and the copper of the matte be prevented from uniting with the lead. It is upon this discovery that the principal feature of our process is based.

As a full understanding of the process can be best imparted by a detailed description of a manner in which it may be carried into practice, such description will now be given, reference being had to the accompanying drawings, which show a furnace of suitable form for the purpose.

In said drawings, Figure 1 is a cross-section of the furnace taken through its body. Fig. 2 is a longitudinal section taken on the line $x\ x$ of Fig. 1, and Fig. 3 is a longitudinal section taken through the body of the furnace, showing the fire-box.

Referring to said figures, it is to be understood that the furnace therein illustrated is of the ordinary reverberatory type, having a working body nearly as broad as it is long. This body is built in a wrought-iron pan, A, standing upon piers of brick-work, with spaces beneath for the circulation of air. The wall on one side of the furnace is provided with a number of arched recesses, B, (four, as shown in the present case,) which open to the interior of the furnace on a level with the lower edge of the sole D. The bottoms of these recesses are slightly inclined toward the sole, and the recesses are about six inches high, six inches wide, and thirteen inches deep. The sole D has an inclination of about six inches, and at its lower side the wall of the furnace is provided with the usual lead-tap, $a$, and at its upper side with the usual matte-tap, $b$. Communicating with the recesses B are vertical passages E, which extend to the top of the furnace-wall. In each of these passages there is suspended a bar of iron, F, the lower end of which extends downward to the bottom of the recess B. The bars F are arranged to be raised and lowered by means of pulleys, (not shown,) or in any other suitable manner.

It is of course to be understood that the iron which will commonly be used in practice will be wrought-iron—such, for example, as ordinary wrought-iron bars—as the sulphur acts upon such iron much more readily than upon cast-iron or steel. When the work is started, the furnace is first charged with a quantity of lead, G, which reaches above the tops of the recesses B. After this lead is brought to a red heat a quantity of the matte, H, roughly broken and equal in weight to about half the weight of the fused lead, is charged upon the surface of the fused lead. The matte soon fuses and spreads over the surface of the lead, as shown. If it is desired to concentrate and purify the matte at the same time it is desilverized, five per cent. of fine sand (silica) is then thrown on the surface of the matte, and the whole is gently rabbled for a few minutes. A series of reactions now take place. The silver and gold, and also the antimony and arsenic, in the matte immediately commence to alloy with the lead. At the same time, also, a portion of the sulphur in the matte unites with the lead, thereby forming sulphide of lead; but this sulphide of lead, as fast as formed, is decomposed by the iron of the bars F, the sulphur being transferred to the iron of the bars, and thereby forming sulphide of iron, which immediately rises, passing through the lead and the matte to the surface of the latter. By this means the sulphur is constantly eliminated from the lead, and the lead consequently remains in such condition that it will continue to receive the silver and gold from the matte and be prevented from taking the copper from the matte. A portion of the lead originally contained in the matte, or which entered the matte from the volume of lead beneath the matte, as before stated, at once unites with the silica floating upon the top of the matte, thereby forming silicate of lead, which in turn attacks the subsulphide of iron which is formed by the partial extraction of the sulphur from the iron in the matte, thereby forming at a low temperature, and without previous roasting of the matte, a highly fluid acid slag, which is absolutely free from copper, and which can be from time to time skimmed off and removed. By this means, and by adding more silica from time to time as it is skimmed off, a large part of the iron contained in the matte can be withdrawn and the copper contained in the matte thereby concentrated, thus avoiding the tedious and expensive process of roasting. This feature is also one of great importance, and may be applied when the iron is not used. The sulphide of iron formed in the lead by the action of the sulphur on the bars F as it rises through the matte is robbed of a portion of its sulphur by the cupriferous portion of the matte, and as it arrives at the surface it is attacked by the silicate of lead and converted into slag and removed, as above stated.

The above reactions are allowed to continue for about thirty minutes, during which time about ninety per cent. of the silver and gold and, if the matte contains lead, the greater part of the lead will be withdrawn from the matte. If the matte runs, for example, two hundred ounces of silver to the ton and thirty per cent. in lead, there will be transferred to the lead bath from the matte during these thirty minutes one hundred and seventy-five ounces of silver and from four hundred and fifty to five hundred pounds of metallic lead free from copper, but carrying most of the antimony and arsenic originally contained in the matte.

If the charge were one ton of matte to two tons of lead, the amount of iron consumed from the bars F to keep the lead free from sulphur and copper will range from ninety to one hundred pounds. If five hundred pounds of lead were reduced from the matte, there will be consumed from the ends of the bars twenty-five pounds for every one hundred pounds of lead reduced.

If the lead used were at the commencement of the operation pure—that is to say, free from antimony, arsenic, &c.—all or practically all of the silver and gold might be withdrawn by the single application. It is desirable, however, in order to avoid the expense of refining large quantities of lead, that the same lead should be used two or more times before it is refined, and consequently the lead which will be most commonly used for the first application will, as in the example stated, be lead which has been already used, and which, consequently, already contains more or less antimony and arsenic, and also a small amount of copper, and these elements, when present, prevent the silver and gold from alloying with the lead as freely and rapidly as they otherwise would. This is particularly the case after the greater part of the silver and gold have been withdrawn from the matte.

When, therefore, such lead is used, only about ninety per cent. of the silver and gold will be withdrawn from the matte by the first application of lead. For this reason, after the process has continued about thirty minutes, as stated, the bars F are raised out of the lead and the lead is tapped off. Another charge of lead of the same weight as the first, but which has not been previously used, and is consequently freer from these objectionable elements and poorer in silver and gold, is laundered into the furnace. The bars F are again lowered and the charge rabbled for a moment and allowed to stand for about ten minutes. This will effect the withdrawal of all the silver and gold from the matte. The desilverized and concentrated matte is then tapped off through the matte-tap into sand molds in the usual manner. The second charge of lead is left in the furnace, and a second charge of matte is then charged in on top of the lead and the process is repeated. By thus alternating every charge of rich but impure lead with one of poor but purer lead the charges can be reused for the first application with fresh matte until the lead becomes rich enough to zinc economically. By this method the furnace-bottom will also be kept poor and loss of silver and gold prevented.

The desilverized matte is treated for its copper by the process described in our Patent No. 308,031, or in any other suitable manner.

The particular form of furnace herein shown has been selected merely for the purpose of illustration. It is to be understood that any other suitable form of furnace may be used, and that the iron may be introduced into the lead in any other suitable manner, it only being essential that the iron should be in contact with the lead, and that it should be in such position as to be out of contact with the melted matte.

What we claim is—

1. The process of recovering the precious metals from copper matte, which consists in subjecting the matte to contact with a body of lead, both being in a fused condition, and at the same time eliminating the sulphur from the lead through the agency of a body of iron which is in contact with the lead, but not with the matte, substantially as described.

2. The process of recovering the precious metals from copper matte, which consists in subjecting the matte to contact with a body of lead, both being in a fused condition, and at the same time eliminating the sulphur from the lead through the agency of a body of iron which is in contact with the lead, but not with the matte, and then treating the matte in the same manner with a second body of lead which is poorer in silver than the first, substantially as described.

3. The process of recovering the precious metals from matte, which consists in subjecting the matte to contact with a body of lead, both being in a fused condition, and at the same time eliminating the sulphur from the lead through the agency of a body of iron which is in contact with the lead, but not with the matte, and then reusing the lead in the same manner with a fresh quantity of matte, substantially as described.

4. The process of recovering the precious metals from copper matte, and at the same time concentrating and purifying the matte, which consists in subjecting the matte to contact with a body of lead, both being in a fused condition, to recover the precious metals, and adding silica to the matte to effect the formation of a slag, substantially as described.

5. The process of recovering the precious metals from copper matte, and at the same time concentrating and purifying the matte, which consists in subjecting the matte to contact with a body of lead, both being in a fused condition, and at the same time eliminating the sulphur from the lead through the agency of a body of iron which is in contact with the lead, but not with the matte, and adding silica to the matte, substantially as described.

In testimony whereof we have hereunto set our hands in the presence of two subscribing witnesses.

JOHN J. CROOKE.
ROBERT CROOKE.

Witnesses:
  JNO. W. VINCENT,
  WILLIAM HALE.